United States Patent
Brueckl et al.

(10) Patent No.: US 8,441,094 B2
(45) Date of Patent: May 14, 2013

(54) RESONATOR ELEMENT AND RESONATOR PIXEL FOR MICROBOLOMETER SENSOR

(75) Inventors: Hubert Brueckl, Wiener Neudorf (AT); Thomas Maier, Vienna (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 0 days.

(21) Appl. No.: 13/202,656

(22) PCT Filed: Feb. 17, 2010

(86) PCT No.: PCT/AT2010/000044
§ 371 (c)(1),
(2), (4) Date: Aug. 22, 2011

(87) PCT Pub. No.: WO2010/094051
PCT Pub. Date: Aug. 26, 2010

(65) Prior Publication Data
US 2011/0304005 A1    Dec. 15, 2011

(30) Foreign Application Priority Data
Feb. 20, 2009 (AT) .................. A 290/2009

(51) Int. Cl.
*H01L 31/101* (2006.01)
(52) U.S. Cl.
USPC .................. 257/467; 257/E31.054
(58) Field of Classification Search .......... 257/467, 257/E31.054
See application file for complete search history.

(56) References Cited

U.S. PATENT DOCUMENTS

| | | | |
|---|---|---|---|
| 5,288,649 A | 2/1994 | Keenan | |
| 5,602,043 A | 2/1997 | Beratan et al. | |
| 5,726,066 A | 3/1998 | Choi | |
| 6,163,061 A | 12/2000 | Iida | |
| 2006/0060784 A1 | 3/2006 | Moon et al. | |
| 2007/0152176 A1* | 7/2007 | Gorrell et al. | 250/493.1 |
| 2007/0222658 A1 | 9/2007 | Puscasu et al. | |

FOREIGN PATENT DOCUMENTS
WO     2007149121 A2     12/2007

OTHER PUBLICATIONS

Maier, et al: "Wavelength-Tunable Microbolometers with Metamaterial Absorbers", Optics Letters, XP001548614, Oct. 1, 2009, pp. 3012-3014, vol. 34, No. 19.

Han et al: "Design of Infrared Wavelength-Selective Microbolometers Using Planar Multimode Detectors", Electronic Letters, XP006022812, Oct. 28, 2004, pp. 1410-1411, vol. 40, No. 22.

(Continued)

*Primary Examiner* — Victor A Mandala
*Assistant Examiner* — Whitney T Moore
(74) *Attorney, Agent, or Firm* — Laurence A. Greenberg; Werner H. Sterner; Ralph E. Locher

(57) ABSTRACT

A resonator element for the absorption and/or conversion of electromagnetic waves having a predefined wavelength, in particular infrared radiation having a wavelength of 2 µm to 200 µm, into heat, has a three-layer structure formed of a first metal layer, a second metal layer and a dielectric layer interposed between the two metal layers. The maximum lateral dimension of the layers is in the range between one quarter and a half of the predefined wavelength.

15 Claims, 3 Drawing Sheets

OTHER PUBLICATIONS

Weling Aniruddha et al: "Antenna-Coupled Microbolometers for Multi-Spectral Infrared Imaging", Proceedings of SPIE: Infrared Technology and Applications XXXII, Apr. 2006, pp. 17-21, vol. 6206, No. 2, Kissimmee, Florida, USA.

Sakran et al: "Absorbing Frequency-Selective-Surface for the mm-Wave Range", IEEE Transactions on Antennas and Propagation, XP011232507, Aug. 1, 2008, pp. 2649-2655, vol. 56, No. 8.
Austrian Office Action dated Feb. 20, 2009.

* cited by examiner

RESONATOR ELEMENT AND RESONATOR PIXEL FOR MICROBOLOMETER SENSOR

BACKGROUND OF THE INVENTION

Field of the Invention

The invention relates to a resonator element for the absorption and/or conversion of electromagnetic waves having at least one predefined wavelength ($\lambda$), in particular infrared radiation having a wavelength of 2 µm to 200 µm, into heat.

Resonator elements of this type are used, in particular, for the wavelength- and polarization-dependent absorption and intensity measurement of electromagnetic radiation.

The invention uses for this purpose resonator elements which are constructed in a layered fashion and which are advantageously separated from one another in a lateral direction. In connection with a layered construction, lateral denotes a direction or orientation running along the layers or parallel to the layers. Layers of this type usually have layer thicknesses that are significantly smaller than the rest of the dimensions.

The maximum lateral dimension of a layer is the maximum distance between two spatial points encompassed by this layer. In the case of rectangular layers, for example, the diagonal is the maximum lateral dimension and, in the case of circular layers, the diameter is the maximum lateral dimension.

BRIEF SUMMARY OF THE INVENTION

The object of the invention is to construct in the simplest possible manner a resonator element in which the lateral geometrical dimensions of the individual resonator elements determine that wavelength at which the incident electromagnetic rays are preferably absorbed. A lateral delimitation or isolated arrangement of a plurality of such resonator elements, which are then thermally decoupled from one another, is of importance. Further requirements made of the invention are a compact design and the possibility of tuning the resonators to different wavelengths and polarizations. The incident radiation is intended to be dissipated wavelength- and polarization-selectively. The aim is furthermore to produce a multispectral and polarization-selective pixel sensor or pixel sensor array for imaging systems based on microbolometers.

The prior art discloses infrared detectors which either are based on an interaction between photons and electrons in the detector material, and that is to say utilize the internal photoelectric effect, or are based on the heating of the detector by absorption of the incident radiation; the latter are also referred to as thermal detectors. Bolometers are thermal detectors in which the heating of the detector is converted into a signal by means of a temperature-sensitive resistor. The temperature increase brought about by absorption of radiation is inversely proportional to the heat conduction from the bolometers into their surroundings. In order to realize microbolometers having a high sensitivity, a specific construction is necessary which largely prevents heat transport from the parts of the bolometer which are heated by incident radiation to the surroundings.

The technical literature discloses frequency-selective surfaces in which resonator elements are used for the frequency-dependent absorption of electromagnetic radiation (F. Sakran et al. "Absorbing Frequency-Selective-Surface for the mm-Wave Range, IEEE Trans. Ant. Prop., Vol. 56, No. 8, pp. 2649-2655 and International Patent Application WO 2007/149121 A2). The resonators described therein consist of a first metal layer in different geometrical forms which lie on an insulating layer, which is in turn applied on a continuous metallic baseplate. On account of the high thermal conductivity of metals, a continuous metallic layer constitutes a thermal short circuit. The use of such frequency-selective surfaces in microbolometers results in a significant increase in heat conduction, and accompanying this a significant decrease in the sensitivity of the bolometers. Such a baseplate can be avoided by means of the resonator elements described in this notification of invention.

The invention achieves the object in the case of a resonator element of the type mentioned in the introduction with the features of the claims.

The invention achieves the object in the case of a resonator element of the type mentioned in the introduction with the features of the characterizing part of claim 1.

These novel resonator elements are characterized by two laterally structured metal layers, which are separated from one another by a likewise laterally structured dielectric. The resonance of a resonator element described here, which explicitly consists of two discrete metal components opposite each other, is independent of a baseplate, which is not necessary here. These resonator elements are thermally decoupled from one another. This prevents heat conduction in a lateral direction. Consequently, laterally stringing together a plurality of resonator elements also meets the stringent requirements made of the thermal design of microbolometers.

According to the invention, the essential advantage is that heat conduction in a lateral direction is prevented by the novel construction of the resonator elements, in particular by the omission of a continuous baseplate. The efficiency of heat transfer to an underlying thermal sensor is thereby increased. Therefore, resonator elements according to the invention are suitable, in particular, for producing multispectral sensor arrays for any desired imaging systems based on microbolometers. With an absorption wavelength being predefined, it is possible to determine a geometry of a resonator element which has an optimum absorption characteristic for this specific predefined wavelength. The resonator elements have a very sharp absorption spectrum and a very low mass and can be produced by standard methods of semiconductor technology.

According to the invention, the essential advantage is that, with a wavelength being predefined, it is possible to determine a geometry of a resonator element which has an optimum absorption characteristic for this specific predefined wavelength. The resonator elements have a very sharp absorption spectrum and a very low mass and can be produced by standard methods of semiconductor technology. Therefore, resonator elements according to the invention are suitable, in particular, for producing multispectral sensor arrays for any desired imaging systems based on microbolometers.

A polarization-selective thermal resonator element is achieved if the dimension of the first metal layer, in particular of all the layers, according to a first lateral direction corresponds to a multiple of, in particular four times to ten times, the dimension of the first metal layer, in particular of all the layers, according to a second lateral direction, which is perpendicular to the first lateral direction. A particularly simple construction and also simple manufacturing by means of semiconductor technology are afforded by resonator elements if at least the first metal layer has the form of a circle or square or if at least the first metal layer has the form of an ellipse or a rectangle.

A particular good resonance behavior is achieved if the layer thickness of the first and second metal layers lies in the range of from 10 nm to 1 µm and/or if the layer thickness of the dielectric layer lies in the range of 25 nm to 10 µm.

Particularly simple manufacturing and production of resonator pixels and resonator elements is achieved if the layer cross-section of the first metal layer, of the second metal layer and also of the dielectric layer is approximately identical in form and size.

Integration of a multiplicity of resonator elements in order to increase the absorption effect in a form that can be realized in a particularly simple manner is afforded by a resonator pixel in which the resonator elements, in particular arranged at mutual distances, are applied on the same side of a common carrier layer, and, in or on the carrier layer, the resonator elements, in particular arranged at mutual distances, are applied on the same side of a common carrier layer, and a temperature sensor is embedded or formed in or on the carrier layer, in particular below the resonator element, or the carrier layer is formed as a temperature sensor, a temperature sensor is embedded or formed or the carrier layer is formed as a temperature sensor.

A resonator pixel can be produced in a particularly simple manner if the carrier layer is formed with a semiconductor, in particular a temperature-sensitive semiconductor.

Resonator pixels for the polarization-sensitive detection of electromagnetic rays are produced by the resonator elements being aligned according to the same predefined lateral direction.

For the imaging detection of electromagnetic rays, a pixel sensor is characterized in that the individual resonator pixels arranged in a grid, by means of their electrical leads, are fixed and/or carried in a manner spaced apart relative to a common carrier and the space surrounding the resonator pixels is evacuated.

DESCRIPTION OF THE INVENTION

Figure 1:
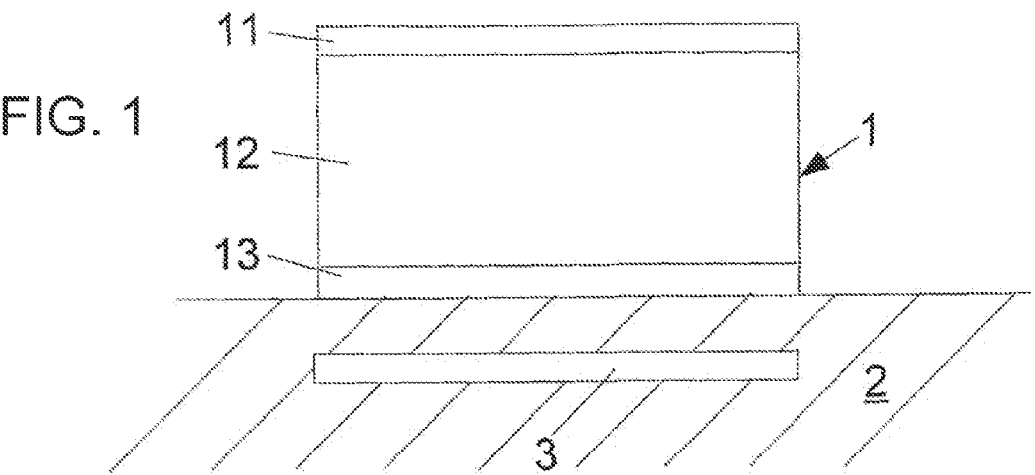
FIG. 1 shows a resonator element according to the invention.

FIG. 1 schematically shows the construction of a resonator element according to the invention, comprising a first conductive metal layer 11, a dielectric layer 12 and also a second metal layer 13. The height of such a resonator element 1, and thus also the thickness of the individual layers 11, 12, 13, lies in the range of from a few 10 nm to approximately 10 µm. In this case, the respective layer thicknesses of the two metal layers 11, 13 lie in the range of from 10 nm to 1 µm. The layer thickness of the dielectric layer lies in the range of from 25 nm to 10 µm. The thickness of the dielectric layer 12 is usually chosen to be significantly greater, for instance greater by a factor of 2 to 10, than the respective layer thickness of the two metal layers 11, 13.

As illustrated in FIG. 1, the resonator element 1 is connected by means of the second layer 13 to a carrier layer 2. In terms of manufacturing technology, this is advantageously achieved by virtue of the fact that the second metal layer 13 is applied or vapor-deposited onto the carrier layer 2, embodied in particular as a semiconductor. In accordance with FIG. 1, a temperature sensor 3 is formed or embedded in the carrier layer 2, this temperature sensor taking up the heat produced by the absorption of the incident electromagnetic waves. As a result of the change in the temperature of the temperature sensor, its electrical characteristic variables, in particular its electrical resistance, are altered. This resistance can therefore be tapped off via electrical connecting leads 52 and be fed to an external processing arrangement.

Alternatively, the possibilities are that the temperature sensor 3 is formed on the carrier layer 2, or that the entire carrier layer 2 consists of temperature-sensitive material and is thus formed as a temperature sensor. This can be achieved, for example, by the entire carrier layer 2 being formed by a temperature-sensitive semiconductor.

The integration of a multiplicity of resonator elements 1 on the carrier layer 2 is possible by means of relatively simple production processes.

Figure 4:
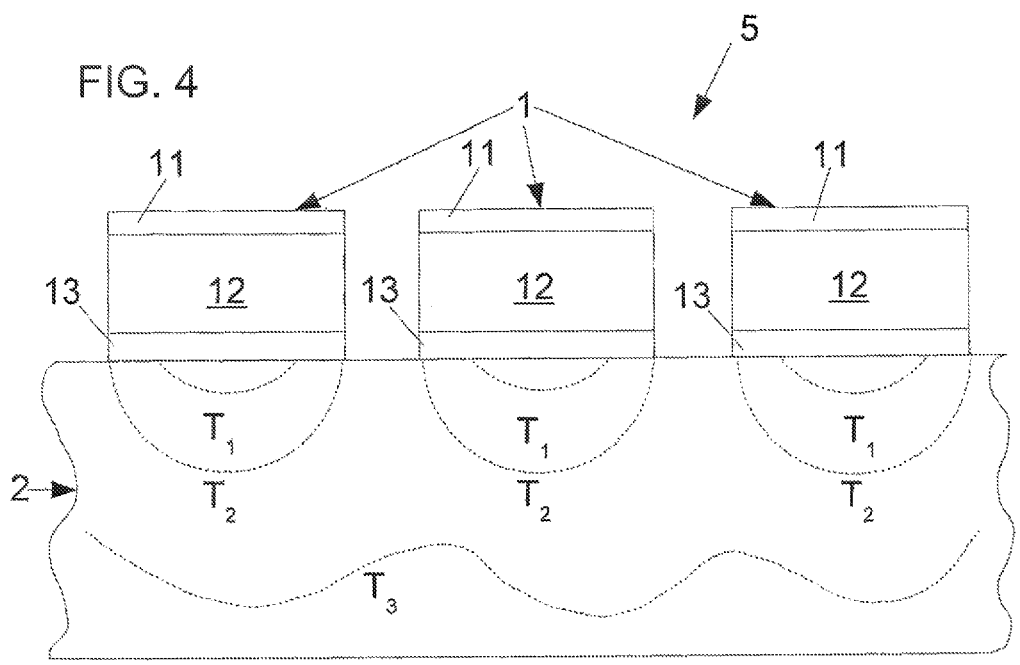
FIG. 4 shows three resonator elements arranged on a common resonator pixel and also the temperature distribution arising as a result of the irradiation in the region of the resonator elements which is near the carrier, or in the lower region of the resonator elements.

FIG. 4 schematically shows the temperature distribution in the region of the carrier layer 2 of a resonator pixel 5 comprising a multiplicity of resonator elements 1. By virtue of the incidence of electromagnetic waves on the individual resonator elements 1, regions having an increased temperature form in the region below the individual resonator elements 1. The temperature increase is greatest directly below or in the center of the resonator elements 1. FIG. 4 schematically illustrates the temperature distribution in the region of the carrier layer 2 by means of ISO temperature lines. The greatest temperature $T_1$ illustrated is attained directly below the resonator elements 1.

In the lower region of the carrier layer 2, the temperature is lower and attains the value $T_3$, for example.

The lateral dimensions of the resonator element 1, and in particular the lateral dimensions of the first metal layer 11, essentially determine the absorption characteristic of the resonator element 1. If, for example a circular circumference of the first metal layer or of the entire resonator element 1 is chosen, then the maximum lateral dimension corresponds to the diameter of the first metal layer 11 or of the entire resonator element 1. The resonator elements are usually constructed in cylindrical or prismatic fashion, that is to say that the layer cross-section of the first metal layer 11, of the second metal layer 13 and also of the dielectric layer 12 is approximately identical in form and size. Owing to the dictates of manufacture, however, deviations from the ideal cylinder or prism shape should always be expected; in particular, the individual layers of the resonator element 1 increase in terms of their size in the direction of the second metal layer 13.

The resonator elements 1 are excited to oscillate by the magnetic component of an electromagnetic wave incident from above. As a result of ohmic or dielectric losses in the individual layers, the energy coupled in is converted into heat, which leads to a local increase in temperature. The incident radiation is absorbed all the more effectively, the closer its frequency is to the natural oscillation frequency of the resonator element 1. The absorption of the resonator elements 1 is wavelength-dependent and has a maximum at the resonance wavelength.

Figure 6:
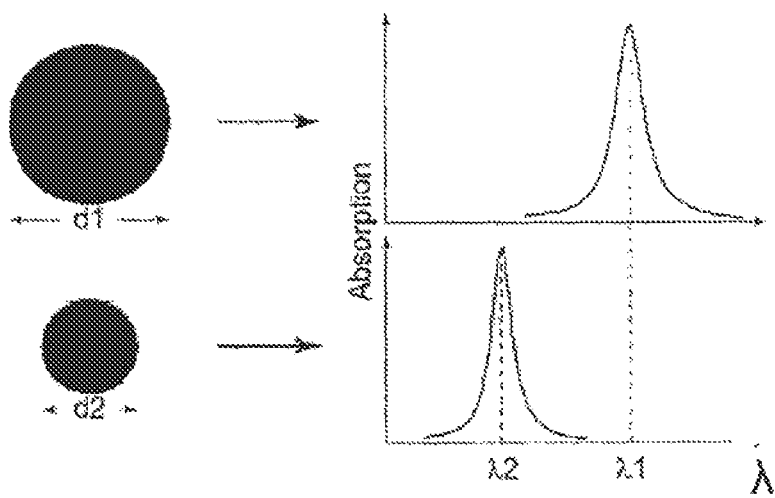
FIG. 6 schematically shows the absorption behavior of circular resonator elements.

The lateral dimensions of the resonator elements 1 are significantly smaller than the resonance wavelength λ. For a given layer construction, the resonant frequency λ of such a resonator element 1 is dependent only on the lateral dimensions. This can be seen schematically in FIG. 6 for cylindrical resonator elements 1. The upper part illustrates the absorption spectrum of a resonator element 1 having the diameter d1 with maximum absorption at the wavelength λ1. In the case of a decrease in the diameter to d2, the absorption maximum shifts to the shorter wavelength λ2.

Figure 7:
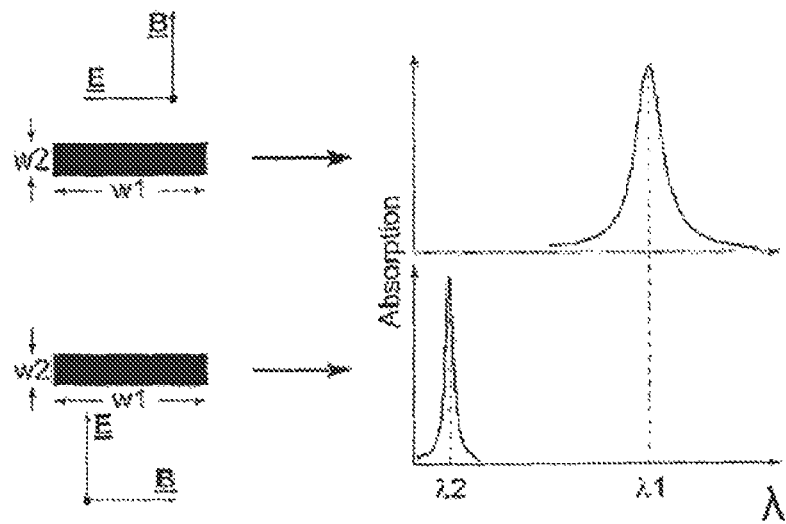
FIG. 7 schematically shows the absorption behavior of polarization-sensitive resonator elements.

Through a suitable choice of the form, e.g. rectangular, elliptic, linear, different resonator frequencies arise along different spatial directions. A polarization-dependent absorption can be realized in this way. This is illustrated in FIG. 7 by way of example for a rectangular resonator element 1 having the side lengths or lateral dimensions w1 and w2. Incident radiation, the magnetic component B of which is polarized orthogonally with respect to the long axis of the rectangle, is preferentially absorbed at the wavelength λ1 (top). Light with a polarization direction rotated by 90° (bottom) is not absorbed at this wavelength λ1, since the corresponding resonance is shifted to the shorter wavelength λ2.

Circular or square layer cross-sections of the two metal layers 11, 13 prove to be advantageous for picking up electromagnetic radiations in a polarization-neutral manner, and rectangular or elliptic metal layers 11, 13 prove to be advantageous for picking up electromagnetic waves in a polarization-sensitive manner.

In the case of polarization-sensitive resonator elements 1 of this type, it is particularly advantageous to configure the dimensions of the first metal layer 11, in particular also of the second metal layer 13 and of the dielectric layer 12, so that the dimension according to a first lateral direction corresponds to a multiple of the dimension according to a second lateral direction, which is perpendicular to the first lateral direction. The ratio of these two dimensions can be chosen at 1:4 to 1:10, for example. Consequently, the surface of the first metal layer of the resonator element corresponds to a rectangle having a length ratio of 1:4 to 1:10 or an ellipse having a major axis ratio of 1:4 to 1:10.

Figure 2:
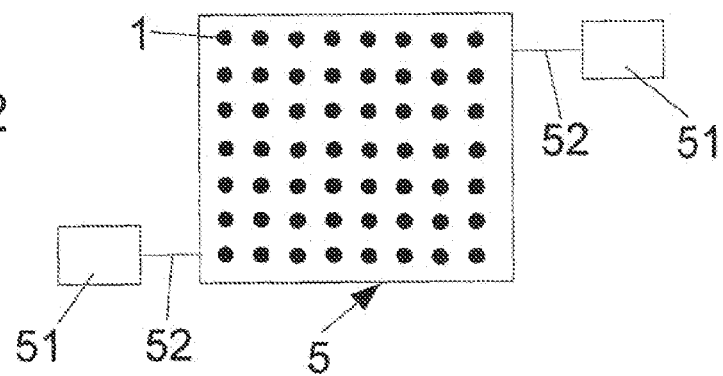
FIG. 2 shows a resonator pixel according to the invention with connections.

With the aid of suitable structuring methods, by stringing together a multiplicity of identically constructed and identically aligned individual resonators in the form of an array, it is possible to cover larger areas on a substrate. It is also possible to produce arrays which preferentially absorb at different wavelengths and/or polarizations. FIG. 2 shows, by way of example, one possible arrangement, with polarization-independent absorption, in which arrays are produced by stringing together circular resonator elements.

Figure 3:
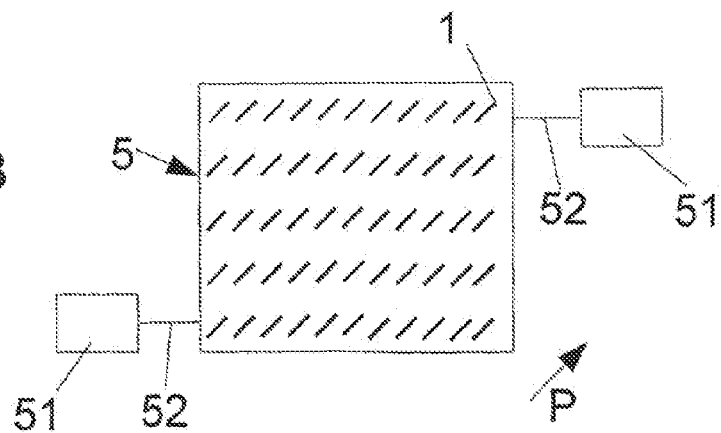
FIG. 3 shows a resonator pixel according to the invention with resonator elements aligned according to the same predefined lateral direction P.

FIG. 3 shows a further possible arrangement of rectangular resonator elements, which are arranged parallel to one another, wherein all the resonator elements 1 are aligned according to the same predefined lateral direction P.

The integration of a multiplicity of resonator pixels 1 into a pixel sensor is particularly advantageous. A pixel sensor of this type comprises a number of resonator pixels 5 arranged in a grid, wherein the individual resonator pixels 5, by means of their electrical lead, are fixed in a manner spaced apart relative to a common carrier 90 and the space surrounding the resonator pixels 5 is evacuated, e.g. by means of a radiation-transmissive housing. Such a construction, which is described schematically in FIG. 5, prevents two resonator pixels 5 that are spaced apart from interacting with one another, in particular interacting by heat conduction. Consequently, it is possible to apply differently shaped resonator elements 1 on adjacent resonator pixels 5 and thus to detect electromagnetic waves having different wavelengths or polarization directions. On account of their low mass, the resonator pixels 5 described are also suitable for integration into thermally decoupled detectors, such as e.g. microbolometers.

Figure 5:
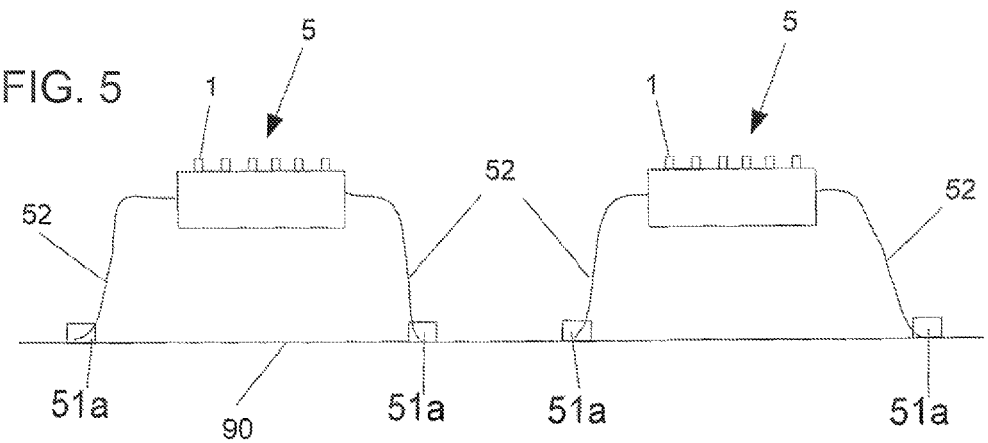
FIG. 5 schematically shows the construction of a pixel sensor comprising a multiplicity of resonator elements.

FIG. 5 schematically shows a pixel sensor, comprising two resonator pixels 5 arranged alongside one another, which are connected to a common carrier 90 by means of their connecting leads 52 via the connections 51. By way of example, an evaluation circuit for determining the individual intensities measured by the resonator pixels 5 is integrated in this carrier 90.

Depending on the size and dimensions of the resonator elements relative to the resonator pixels, it can be provided that the lateral dimensions of the second metal layer, if appropriate also of the dielectric layer 12, exceed the lateral dimensions of the first metal layer 11 by at least double the dimensions. In this case, dimension is understood to mean, in particular, the maximum lateral dimension.

The resonator elements are thus arranged in an isolated fashion on a carrier and tuned to a predefined wavelength in accordance with their lateral dimension. A rectangular resonator element can be tuned to two wavelengths, that is to say to one wavelength predefined by the longer lateral dimension and to another wavelength predefined by the shorter lateral dimension.

The individual resonator elements do not touch one another and project from their carrier at a predetermined mutual distance.

The invention claimed is:

1. A resonator element for absorbing and/or converting electromagnetic waves having a given predefined wavelength into heat, the resonator element comprising:
   a three-layered construction formed of three layers having a first metal layer, a second metal layer, and a dielectric layer disposed between said first and second metal layers;
   said layers having a maximum lateral dimension lying in a range of between one quarter and one half of the given predefined wavelength.

2. The resonator element according to claim 1, wherein the electromagnetic waves are infrared radiation having a wavelength between 2 μm and 200 μm.

3. The resonator element according to claim 1, wherein a dimension of all of said layers in a first lateral direction corresponds to a multiple of a dimension of all of said layers in a second lateral direction that is perpendicular to said first lateral direction.

4. The resonator element according to claim 3, wherein said multiple is four times to ten times.

5. The resonator element according to claim 3, wherein said first metal layer has a form of an ellipse or a rectangle.

6. The resonator element according to claim 1, wherein said first metal layer has a form of a circle or a square.

7. The resonator element according to claim 1, wherein a layer thickness of said first and second metal layers lies in a range from 10 nm to 1 μm and/or wherein a layer thickness of said dielectric layer lies in a range from 25 nm to 10 μm.

8. The resonator element according to claim 1, wherein a layer cross-section of said first metal layer, of said second metal layer, and of said dielectric layer is substantially identical in form and size.

9. A resonator pixel, comprising:
   a common carrier layer having a given side;
   a plurality of resonator elements according to claim 1 applied on said given side of said common carrier layer; and a temperature sensor, wherein said temperature sensor is embedded or formed in or on said carrier layer, or said carrier layer is formed as a temperature sensor.

10. The resonator pixel according to claim 9, wherein said temperature sensor is disposed below said resonator element.

11. The resonator pixel according to claim 9, wherein said resonator elements are disposed at mutual spacing distances from one another.

12. The resonator pixel according to claim 9, wherein said carrier layer is formed with a semiconductor.

13. The resonator pixel according to claim 12, wherein said semiconductor is a temperature-sensitive semiconductor.

14. The resonator pixel according to claim 9, wherein said resonator elements are aligned according to a common pre-defined lateral direction, and wherein, in each of said resonator elements, a dimension of all of said layers in a first lateral direction corresponds to a multiple of a dimension of all of said layers in a second lateral direction that is perpendicular to said first lateral direction.

15. A pixel sensor, comprising:
a plurality of resonator pixels according to claim 9 arranged in a grid;
wherein individual said resonator pixels have electrical leads fixing and/or carrying said resonator pixels spaced apart relative to a common carrier; and
wherein a space surrounding said resonator pixels is evacuated.

* * * * *